United States Patent [19]
Biggs et al.

[11] Patent Number: 5,709,898
[45] Date of Patent: Jan. 20, 1998

[54] PROCESS FOR THE MANUFACTURE OF A FOOD PRODUCT

[75] Inventors: Donald Reginald Biggs, Bedford, United Kingdom; Gerlof Louwrens van Hoek, Nijverdal, Netherlands; Johannes Krieg, Rotterdam, Netherlands; Franciscus Johannes Hersbach, Zevenhuizen, Netherlands

[73] Assignee: Good Humor-Breyers Ice Cream, Division of Conopco Inc., Green Bay, Wis.

[21] Appl. No.: 699,376

[22] Filed: Aug. 19, 1996

[30] Foreign Application Priority Data

Aug. 22, 1995 [EP] European Pat. Off. ............ 95305856

[51] Int. Cl.[6] ................................................. A21D 13/00
[52] U.S. Cl. ......................... 426/297; 426/89; 426/94; 426/95; 426/100; 426/101; 426/104; 426/138; 426/139
[58] Field of Search .............................. 426/297, 89, 104, 426/100, 101, 138, 139, 94, 95, 391, 273

[56] References Cited

U.S. PATENT DOCUMENTS

Re. 20,118  9/1936  Schomo .......................... 99/137
5,284,672  2/1994  Ito .................................. 426/549

FOREIGN PATENT DOCUMENTS

| 2 012 681 | 3/1970 | France . |
| 2 680 635 | 3/1993 | France . |
| 410 112 | 11/1994 | Germany . |
| 201100 | 7/1923 | United Kingdom . |
| 2 207 033 | 1/1989 | United Kingdom . |
| 2 168 233 | 6/1996 | United Kingdom . |

*Primary Examiner*—Lien Tran
*Attorney, Agent, or Firm*—James J. Farrell

[57] ABSTRACT

A process for the manufacture of a food product comprising a wafer filled with a food core, process including the steps of: (i) shaping the food core; (ii) heating at least part of the wafer in order to provide sufficient plastic properties to the wafer to shape; and (iii) shaping the wafer around the pre-shaped food core, the food core acting as a former.

8 Claims, 1 Drawing Sheet

PROCESS FOR THE MANUFACTURE OF A FOOD PRODUCT

TECHNICAL FIELD OF THE INVENTION

The invention relates to a process for the manufacture of food products comprising a wafer and at least one filling.

BACKGROUND TO THE INVENTION

Many filled wafer products are known, particularly in the ice cream industry. The wafer may be provided in a number of shapes such as cones, cups, hollow rods, shells. Conventionally such products have been manufactured by first shaping the wafer and then filling the shaped wafer with the desired filling.

GB 2 168 233 (Frans Haas Waffelmaschinen industriegesellschaft mbH) discloses a food product comprising two or more wafer layers made from a folded, discrete wafer cake containing at least one edible filling. The filling is introduced to the pre-folded wafer.

This provides the problem of how to dose the filling, particularly when the shape of the wafer does not define an enclosed space, for example is in the shape of a shell such as a taco shell. This can result in loss of some of the filling from the open sides of the wafer, providing a poor quality product.

We have solved this problem by using the filling or food core itself as a former around which the wafer can be conveniently shaped.

DISCLOSURE OF THE INVENTION

Accordingly the invention provides a process for the manufacture of a food product comprising a wafer filled with a food core, said process including the steps of:

(i) shaping the food core;

(ii) heating at least part of the wafer in order to provide sufficient plastic properties to the wafer to shape; and (iii) shaping the wafer around the pre-shaped food core, the food core acting as a former.

Wafers are baked products which are made from wafer batter and have a crisp, brittle and fragile consistency. They are baked to have a very low moisture content. On reheating, the wafers become plastic or deformable and are thus able to be shaped as desired. The required heating conditions to achieve this plastic nature will be readily determined by the skilled person and will depend on the composition of the wafer batter. Generally the temperature will be above 100° C. and less than 250° C. Certain additives to the batter, such as sorbitol, glycerol and monosaccharides, for example glucose, fructose, will reduce the heat required to achieve the plastic state.

Although preferred, it is not necessary to heat the entire wafer, the heat may be directed only to the area of the wafer that needs to be manipulated. For example if the wafer is to be folded along its diameter to form a shell, it is only necessary to heat the wafer in the region of the diameter.

Any suitable method of heating may be used, for example the wafer may be heated in an oven, on a heated plate, or a combination thereof. In a preferred process, the wafer may be heated on plates which are adapted to move to achieve the required final shape.

It may be advantageous to partially shape the wafer prior to the process of the invention, for example in order to readily orientate the wafer before the final shaping process.

The food core may comprise any desired ingredients such as ice cream, fish, meat, vegetables, fruit, nuts, chocolate pieces and the like. Preferably the food core is ice cream.

The food core, when ice cream, will generally have an outer surface temperature of below −10° C., preferably below −20° C., most preferably about −30° C. immediately prior to shaping the wafer around the core.

Optionally either the food core, or the wafer may be coated with a barrier coating, such as a fat or fat based coating, prior to the shaping of the wafer around the food core. Suitable fat or fat based coatings include butter, chocolate (based on cocoa butter) and compound couvertures (based on other fats).

Preferably the food core rather than the wafer is coated. In this case, on heating of the wafer, the heating should be sufficient not only to achieve the required plasticity in the wafer, but also to enable the transfer of the barrier layer from the ice cream to the wafer. This results in a product having its individual components advantageously adhered together.

The wafer may be shaped around the food core to achieve any desired shape such as a shell, core, hollow tube, cup, envelope. Preferably the wafer has a substantially circular shape and preferably has a diameter of 50–150 mm. The food core preferably is a semi-circle having a radius corresponding to 40–60% more preferred about 50% of the diameter of the wafer preferably a thickness of 1–3 cm.

If desired after shaping the wafer around the food core, the product can be further processed. For example a coating may be applied to the product for example covering that part of the food core that is not covered by the wafer. A suitable embodiment for example relates to a circular wafer folded around a semi-circular food core to form a taco like product, followed by the dipping of the circular side of the product in a coating. If the food core is ice-cream, preferably the coating is chocolate or couverture if desired filled with particulates such as nuts, crisps etc.

The invention is further illustrated by the drawings.

This system provides a filled wafer product, the wafer being folded along its diameter into a shell shape.

EXAMPLES

Example 1

Figure 1:
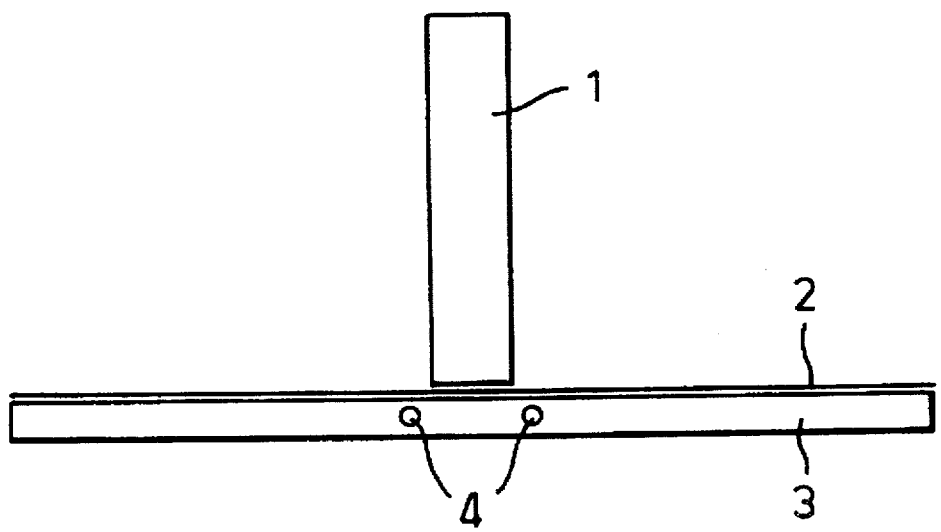
FIG. 1 shows a shaped food core (1) located on a wafer (2) which is on a heated plate (3). The heated plate is provided with hinges (4) to permit the plate to fold.
Figure 2:
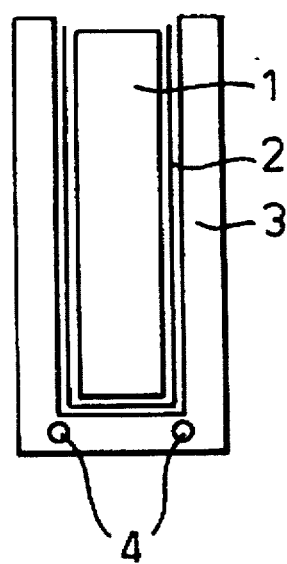
FIG. 2 shows the heated plates (3) from FIG. 1 in the folded position.

The following wafer composition:

|  | % by weight |
| --- | --- |
| Flour | 67.0 |
| Sucrose | 24.2 |
| Invert sugar | 4.5 |
| Fat | 2.2 |
| Salt | 1.6 |
| Lecithin | 0.5 | was shaped into a circular wafer having a 110 mm diameter. The wafer was placed on a plate which had been pre-heated to 200° C. The plate was provided with hinges as shown in FIG. 1. The wafer was retained on the plate for about 15 seconds before an approximately semi-circular shaped ice-cream core (radius 55 mm) was placed along the diameter of the wafer. The ice-cream core had been pre-coated with fat-based couverture. The hinged plate was then moved such that the wafer was folded along its diameter around the ice-cream core. The plates were held in contact with the wafer for a further 5 seconds to ensure sufficient melting of the couverture and the resulting good bonding of the couverture to the wafer with minimal melting of the ice cream surface.

Example 2

Example 1 was repeated except the wafer was treated with soyabean oil (25% by weight of wafer weight) so as to provide a uniform coating over the surface of the wafer. The plate was pre-heated to 160° C. The wafer was initially heated on the plate for about 15 seconds prior to bending and addition of the ice cream core. The plates were then held in contact with the folded wafer for a further 3 seconds.

Example 3

Example 1 was repeated except that the product containing wafer and ice-cream was further processed by dipping the circular side (composed by two wafer layers and the circular side of the ice-cream) in a container with molten couverture containing nut particles.

The resulting product had an attractive appearance and very good eating characteristics.

We claim:

1. A process for the manufacture of a food product comprising a wafer filled with a food core, said process including the steps of:

(i) shaping the food core;

(ii) heating at least part of the wafer in order to provide sufficient plastic properties to the wafer to shape; and (iii) shaping the wafer around the pre-shaped food core, the food core acting as a former.

2. A process according to claim 1 wherein the entire wafer is heated.

3. A process according to claim 1 wherein the wafer is heated to a temperature of from greater than 100° C. to less than 250° C.

4. A process according to claim 1 wherein a barrier coating is either pre-applied to the wafer prior to step (ii) or applied to the shaped food core after step (i).

5. A process according to claim 4 wherein the barrier coating is a chocolate or couverture layer.

6. A process according to claim 1 wherein the food core is ice cream.

7. A process according to claim 1 wherein the wafer is a substantially circular shape and the food core is a semi-circle having a radius corresponding to 40–60% of the diameter of the wafer.

8. A process according to claim 1, wherein after step (iii) a coating is applied to the part of the food core that is not covered by the wafer.

* * * * *